3,499,061
N-VINYL IMIDE MODIFIED POLYPROPYLENE
Harold Jabloner, Wilmington, Del., assignor to Hercules Incorporated, Wilmington, Del., a corporation of Delaware
No Drawing. Filed Apr. 7, 1967, Ser. No. 629,084
Int. Cl. C08f 27/08, 19/00
U.S. Cl. 260—878　　　　　　　　　　　　　　　2 Claims

ABSTRACT OF THE DISCLOSURE

A graft copolymer of polypropylene and N-vinyl phthalimide. Such copolymers are found to be more readily dyeable with disperse dyes than is unmodified polypropylene.

---

This invention relates to the improvement of dyeability of stereoregular polypropylene and to novel graft copolymers whereby such improvement is effected.

One of the most troublesome drawbacks encountered in the commercialization of stereoregular polypropylene to date has been the difficulty experienced in the dyeing of the polymer. Polypropylene, in its molecular structure, resembles a high molecular weight, substantially saturated hydrocarbon molecule. As a result, it is quite inert to, and incompatible with most other materials, including dyestuffs.

In order to improve the dyeability of polypropylene, a number of methods have been proposed. In particular, it has been proposed to graft onto the polypropylene chain, a monomer having polar functional groups which would themselves be dye receptive. Maleic anhydride, acrylate monomers and vinyl pyridine have been found to be of limited value in this technique. However, the graft copolymers known to the prior art as dyeing additives are not totally satisfactory for a number of reasons. For one thing, many of these materials exhibit poor spinnability for fiber production. In other cases, the dyeings are deficient in their wash fastness, light fastness, and solvent resistance. Others do not exhibit very good dye levelling.

Now in accordance with this invention, a modified polypropylene has been found which is readily spun into filaments and drawn to form useful yarns and which can be dyed to excellent levelness and fastness. The novel modified polypropylene of this invention is a graft copolymer of stereoregular polypropylene and about 2 to 40% by weight, based on the weight of polymer, of an N-vinyl phthalimide.

The novel polymers of this invention can be prepared by hydroperoxidizing the polypropylene with molecular oxygen as, e.g. pure oxygen or air, at about 20° to 200° C. preferably in the presence of a free radical generator such as a peroxide, azonitrile, or persulfate and a cationic surface active agent, and thereafter contacting the hydroperoxidized polypropylene with the N-vinyl phthalimide monomer in the presence of a reducing agent. Other methods are described in, e.g., U.S. 2,837,496 to Vandenberg, and Belgian Patent 607,269. Each method involves the formation of active sites along the polypropylene molecule and addition of the vinyl compound modifier thereto. Each is satisfactory in preparing the modified polymer of the instant invention.

The graft copolymers of this invention and mixtures of the same with unmodified polypropylene can be spun into filaments readily by employing known spinning techniques and equipment. Following spinning, the copolymers can be drawn to increase their tensile strength and other properties in the same way that unmodified polypropylene filaments can be drawn. Their utility is, of course, not limited to the fiber application. They can be used in other applications, as, e.g., in molding, film forming and any other application where unmodified polypropylene is now found useful.

It has been found that the N-vinyl phthalimide—polypropylene graft copolymer, by itself, without further modification, exhibits a relatively good dyeability using disperse dyestuffs and imparts good dyeability to unmodified polypropylene when blended therewith. However, when the copolymer is post-treated with boiling water or with a basic nitrogen containing compound, the dyeability with disperse dyes is substantially improved. The post-treatment can be effected with virtually any amino type compound which exhibits reasonably strong basic reactivity (i.e., primary or secondary amine) in liquid, gaseous, or solution form. Such materials include, by way of example, dimethylamine, diethylamine, ethylene diamine, dimethylaminopropylamine, hexamethylene diamine, diethylene triamine, ammonia, hydrazine, pyridine, morpholine, glycine, and alanine.

The disperse dyed fibers prepared with amino treated graft copolymer, in addition to being excellently dyed, i.e., level dyeings, exhibited surprisingly good light-, wash-, and perclene-fastness. This is surprising considering the generally relatively poor fastness of the same dyes when used with unmodified polypropylene or other graft modified polypropylenes. The good dyeing properties of these polymers are not readily explained. It appears to be something more than the usually expected chemical affinity between the dyestuff and the functional group on the polymer since the improved dyeability is usually not noted with acid dyes which would be expected to react well with the basic amine and amide linkages formed by the treatment.

The invention is clearly demonstrated in the following illustrative examples. Parts and percentages are by weight unless otherwise specified.

EXAMPLES

Stereoregular polyproypylene of intrinsic viscosity about 2.2 (measured in decahydronaphthalene at 135° C.) was oxidized to the hydroperoxide form as follows: To a glass-lined reaction vessel were added about 170 parts of distilled water and about 0.52 part of dioctadecyldimethylammonium chloride and the mass was agitated for about five minutes. To this soap solution was added 34 parts of the polypropylene in flake form and agitation was continued for an additional 30 minutes to assure thorough wetting of the flake by the soap. The reactor was then thoroughly purged with oxygen, pressurized to about 5 p.s.i.g., and the temperature was raised to about 100° C. When the temperature reached 100° C., a charge consisting of about 1.2 parts potassium persulfate in 21 parts water was added over a period of 10 minutes, with continued vigorous agitation. When all the persulfate had been added, the temperature was held at 100° C. for 10 more minutes and the reaction mixture was then cooled to 35° C. as quickly as possible. The resultant product was filtered and thoroughly washed with distilled water. Analysis of this product showed the hydroperoxide content to be 0.057 meq./gram.

About 25 parts of the water-wet filter cake was charged to a second glass-lined reactor along with 58 parts of n-heptane. This charge was azeotropically distilled until the temperature rose to 87° C., indicating removal of all water. The polymer at this point analyzed 0.026 meq. hydroperoxide/gram.

Seventeen (17) parts of N-vinyl phthalimide was added to the reactor and the temperature was raised to 65° C. while purging with nitrogen. When 65° C. was reached, 0.08 part of benzoin and 0.23 part triethylamine were added and agitation continued for about 2 minutes, at which time 0.034 part ferric stearate was added. The mass was then maintained at 65° C. for one hour longer.

The product was then cooled to 30° C., filtered, washed well with ethanol, then with methanol, and dried in a vacuum oven for about 16 hours at room temperature. About 20.2 parts of product was recovered, containing about 6.6% N-vinyl phthalimide.

The powder was stabilized with 0.5% of a reaction product of 1 mole crotonaldehyde and 3 moles 3-methyl-6-t-butylphenol, 0.5% of dilauryl thiodipropionate and 0.5% $PCl_3$—3-methyl-6-t-butylphenol reaction product, and spun into yarn by means of a standard spinning head and extruder at 482° F. The resultant yarn could be drawn 4.75× by means of heated, differentially driven feed and draw rolls maintained at 225° and 280° F. respectively.

Skeins of the undrawn yarn were treated with water solution of amino compounds as follows:

| | Amino Compound | Concentration, percent | Temperature (° C.) | Time (hrs.) |
|---|---|---|---|---|
| a | Dimethylaminopropylamine | 2 | 65 | 2 |
| b | 1,6-hexanediamine | 2 | 65 | 2 |
| c | Morpholine | 2 | 65 | 2 |
| d | β-Alanine | 2 | 65 | 2 |
| e | Hydrazine | 2 | 65 | 2 |
| f | Ammonia | 28–30 | 25 | 1 |
| g | Dimethylamine | 25 | 25 | 1 |

The treated yarns were then dyed with the disperse dye, Resolin Red FB, using a standard disperse dyeing technique. The quality of the dyeings, the wash fastness, preclene fastness and fade resistance after 20, 40 and 60 hrs. exposure in the carbon arc fade-o-meter were determined. These parameters were evaluated visually and a rating from 1 to 5 assigned to each, 1 being very poor and 5 being excellent.

| | Dyeability | Wash fastness | Perclene fastness | Fade-o-Meter 20 | Fade-o-Meter 40 | Fade-o-Meter 60 |
|---|---|---|---|---|---|---|
| a | 5 | 4 | 3–4 | 4− | 3+ | 3 |
| b | 5 | 4 | 3 | 4 | 4− | 3+ |
| c | 5 | 4 | 3–4 | 4− | 3 | 3− |
| d | 5 | 4 | 3 | 4− | 3 | 3− |
| e | 5 | 4 | 3 | 4 | 4− | 3 |
| f | 5 | 4 | 3–4 | 4 | 3 | 3− |
| g | 5 | 4 | 3–4 | 4 | 4− | 3 |

The graft copolymers are readily dyeable with disperse dyes generally. Other disperse dyes, in addition to Resolin Red FB, which are usable include Polydye Blue GSFR and Celliton Fast Yellow 4RL.

While the dyeings reported in the above examples were effected on undrawn yarns, the invention is not so limited. Level, fast dyeings can also be obtained when the yarn is subjected to an orienting draw of up to about 4.75× prior to dyeing. It is also feasible to draw the yarn after dyeing of the same.

What I claim and desire to protect by Letters Patent is:

1. As a new composition of matter a graft copolymer of stereoregular polypropylene and 2 to 40% of N-vinyl phthalimide, based upon the weight of the polypropylene.

2. The process of preparing disperse dyeable polypropylene which comprises grafting to said polypropylene 2 to 40%, N-vinyl phthalimide, based on the weight of the polypropylene, and treating the resultant graft copolymer with a basic nitrogen containing compound.

References Cited

UNITED STATES PATENTS 3,131,990   5/1964   Bonvicini et al. _____ 260—878
3,188,165   6/1965   Magat et al. _____ 260—878

OTHER REFERENCES

Chemical Abstracts, vol. 67, Nov. 27, 1967 100552(h).

SAMUEL H. BLECH, Primary Examiner

M. J. TULLY, Assistant Examiner

U.S. Cl. X.R.

8—55, 4, 115.5; 260—877, 41